United States Patent [19]

Hope

[11] 4,230,465
[45] Oct. 28, 1980

[54] POLLUTION CONTROL APPARATUS AND METHOD

[76] Inventor: Mrs. Edward Hope, 117 Northview Ave., Whitby, Ontario, Canada

[21] Appl. No.: 786,631

[22] Filed: Apr. 11, 1977

[51] Int. Cl.$^2$ ............................................. B01D 50/00
[52] U.S. Cl. ........................................ 55/83; 55/96; 55/97; 55/261; 55/315; 55/354; 55/454; 55/290
[58] Field of Search ...................... 55/1, 83, 84, 92, 96, 55/97, 235–238, 242, 259, 261, 290, 315, 337, 354, 459 A, 454, 459 R

[56] References Cited

U.S. PATENT DOCUMENTS

| | | | |
|---|---|---|---|
| 648,575 | 5/1900 | Scheiffler | 55/290 |
| 1,478,750 | 12/1923 | McElroy | 55/83 |
| 2,608,267 | 8/1952 | Ortgies | 55/238 |
| 2,650,675 | 9/1953 | Yellott | 55/83 |
| 3,233,391 | 2/1966 | Olsen | 55/290 |
| 3,395,512 | 8/1968 | Finney, Jr. et al. | 55/80 |
| 3,449,117 | 6/1969 | Derham | 55/261 |
| 3,864,107 | 2/1975 | Baigas, Jr. | 55/290 |
| 3,907,671 | 9/1975 | Baigas, Jr. | 55/459 |

FOREIGN PATENT DOCUMENTS 658471 10/1951 United Kingdom ..................... 55/83

*Primary Examiner*—Bernard Nozick

[57] ABSTRACT

Pollution control apparatus and a method for removing particulate matter from a gas at temperatures of up to about 3000° F. are disclosed comprising a gas centrifuge having effluent and influent openings and a spray nozzle positioned to inject a stream of a refrigerated fluid at the effluent gas passing through the centrifuge. The spray nozzle is arranged to force particulate matter against the walls of the gas centrifuge in order to facilitate removal of particles in the gas stream and also to cool the gas to a low temperature after which it may be either discharged into the atmosphere or processed through a moving filter at low temperatures to further remove any finer particles in the gas passing through the apparatus. The lower temperatures of the gas emanating from the gas centrifuge allow the use of a cloth or synthetic fiber filter such as a Dacron (trademark) filter.

6 Claims, 3 Drawing Figures

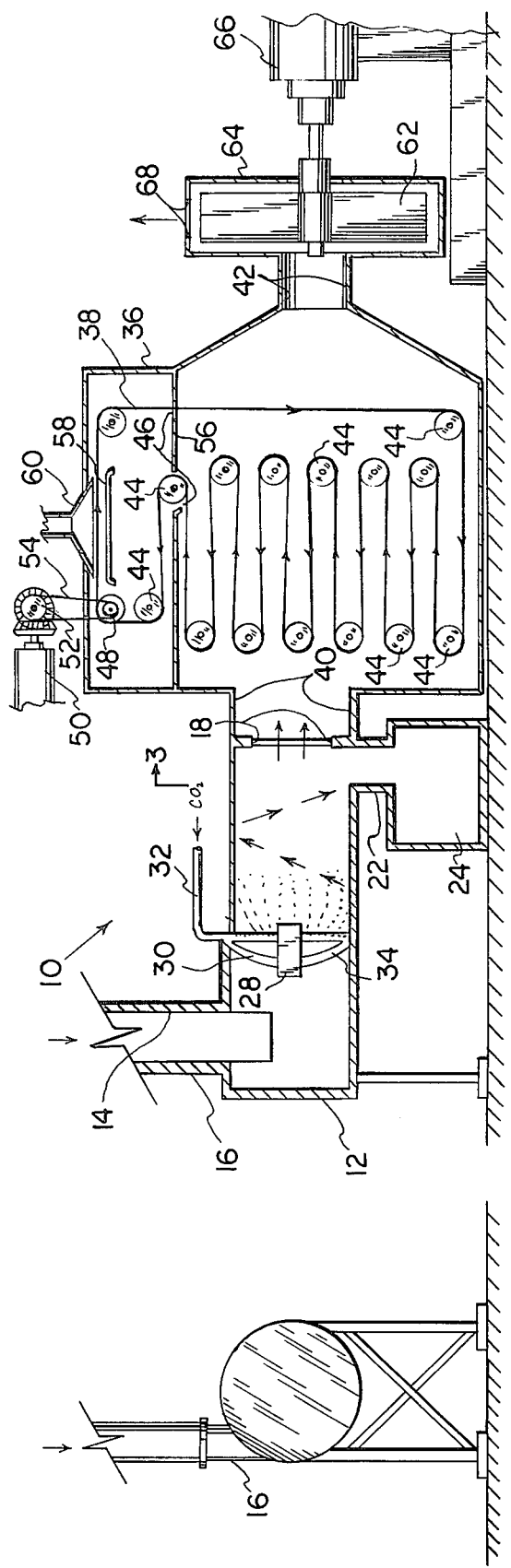
FIG. 2
FIG. 1
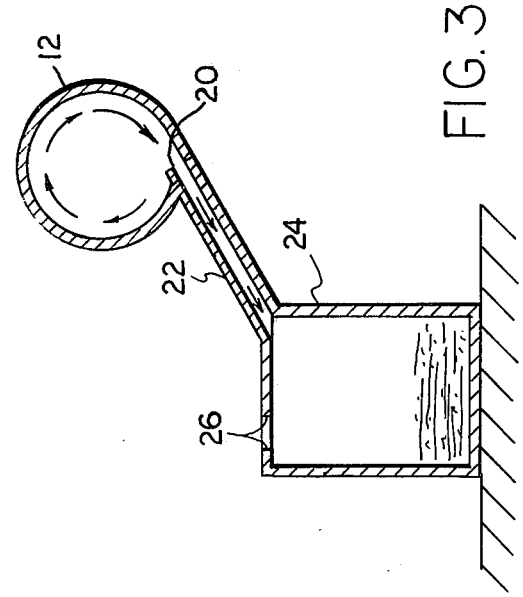
FIG. 3

POLLUTION CONTROL APPARATUS AND METHOD

SUMMARY OF THE INVENTION

The present invention relates to a particle removing apparatus for removing particulate matter from a gas having a temperature of up to about 3000° F. and comprises a gas centrifuge member for receiving a gas having a temperature to about 3000° F., said gas having a particulate matter entrained therein. The gas centrifuge has gas influent and gas effluent openings therein, the gas centrifuge also having a particulate effluent opening therein. An injection nozzle member is provided in the centrifuge for injecting a refrigerated fluid into the gas stream in the gas centrifuge.

A filter screen may be provided downstream of and operatively associated with the gas effluent.

The gas centrifuge may comprise a cyclone separator, the nozzle being positioned to blast particles from a gas stream passing through the apparatus to the outer walls of the cyclone separator.

The injection nozzle member may comprise a nozzle adapted to inject a fluid having a temperature from about −110° F. to about −320° F.

The filter screen may comprise a moving filter screen.

A particle removing member may also be provided operatively associated with the moving filter screen to remove any particulate matter therefrom. The particle removing member may comprise a vacuum cleaner. The apparatus may further comprise a fan member operatively associated with the gas effluent opening for drawing fluids through the apparatus.

The invention also relates to a method for removing particulate matter from a gas having a temperature of up to about 3000° F. and especially from about 500° F. to about 3000° F. and comprises passing the gas through a gas centrifuge to centrifically remove particulate matter therefrom, cooling the gas when the particulate matter is being removed therefrom to a temperature of less than about 400° F. and especially less than 250° F. by means of a stream of a refrigerated fluid having a temperature from about −50° F. to about −400° F. and especially about −110° F. to about −320° F. and simultaneously forcing particulate matter from the gas to the inner peripheral wall of the gas centrifuge to remove particulate matter from the gas.

The method may further comprise employing as the gas centrifuge a cyclone separator, a refrigerated fluid being used to force particulate matter in the gas around the inner peripheral wall of the cyclone separator.

The method may also comprise directing the flow of the gas from the gas centrifuge to a filter screen and removing particulate matter deposited from said gas on said filter screen. A moving filter screen may be employed and the particulate matter deposited thereon may be removed by vacuuming the filter screen.

The method may also comprise the further step of pumping the gas through the gas centrifuge by means of pump apparatus such as a fan or the like.

BRIEF DESCRIPTION OF THE DRAWING

FIG. 1 comprises an end view of a gas centrifuge employed for the removal of gas particles from a gas stream at a temperature of about 2500° F. according to one embodiment of the present invention;

FIG. 2 comprises a side elevation in section of particle removing apparatus for removing particulate matter from a gas having a temperature of about 2500° F. and which exits the system after being treated therein at a temperature of about 250° F. according to another embodiment of the present invention; and FIG. 3 comprises a front elevation in section taken along the line 303 of FIG. 2.

DETAILED DESCRIPTION OF THE PREFERRED EMBODIMENT

Apparatus for removing particulate matter from gas streams is disclosed in the prior art U.S. Pat. Nos. Skrivan 3,679,363; Prince, et al., 3,667,191; Klein 3,634,067; Walker, et al. 3,633,337; Jaeger 3,599,398; Bowman 3,530,805; Bowman 3,530,806 and Neuman 3,453,808.

The effluent from electric arc furnaces employed for melting metals such as steel, iron and the like produces considerable volumes of gaseous effluents having metal particles and other particles of combustion or melting therein which is ordinarily treated by means of filtering apparatus before the gaseous effluent is discharged into the atmosphere. A typical system comprises the employment of a fabric bag; however, because of the approximately 2500° F. temperatures of the gaseous effluents, the gas stream has to be cooled before passing through the fabric bag in order to prevent the filter system from being ignited. The gaseous effluent is therefore cooled to temperatures of about 250° to prevent these bags from burning, this cooling process being accomplished by means of metal pipes such as steel pipes or iron pipes anywhere from about 8 or 10 or 12 feet in diameter. Additionally, these pipes are of considerable length in order to provide an adequate metal surface to act as a heat exchanging surface and in some installations lengths of pipe up to 250 feet or greater may be employed. One of the disadvantages of the aforementioned filters is that they cost on the average of about $250,000 as typified by the "American Air Filter" system and additionally, the installation cost, material cost for the steel pipes or iron pipes and the additional investment in land in order to accommodate the lengths of pipe needed to reduce the temperature of the effluent gases are all factors that tend to make the installation of such filtering undesirable from an industrial aspect.

A typical system somewhat analgous to those employed to reduce the pollutants emanating from an electric arc furnace is described in the Skriven reference noted above in which a plasma jet is employed to react phosphate rock with hydrogen for the conversion of the phosphate rock into phosphorous after which the gaseous effluent from the plasma is passed through a heat exchanger and the effluent then filtered by means of a filter bag and phosphorous removed from the filtered gas stream by means of water scrubbing. The heat exchanger fluid in this respect comprises a conventional heat exchanger and in this respect is not too different from the conventional system employed for the filtering of effluent gases from electric furnaces.

It is therefore an object of the present invention to overcome these and other difficulties encountered in the prior art.

It is a further object of the present invention to provide a novel filtering apparatus for the removal of particulate matter from gas streams at elevated temperatures especially the gaseous effluent from an arc furnace, such gaseous streams having temperatures up to about 3000° F.

It is a further object of the present invention to provide apparatus that reduces the initial purchase cost of such a filtering system.

It is a further object of the present invention to provide apparatus which will reduce the installation and commissioning costs of such a system.

It is also an object of the present invention to provide apparatus for filtering as previously described which does not require large long run ducts thereby reducing the structural steel costs of the installation.

It is a further object of the present invention to provide the foregoing filtering apparatus for installation at relatively small arc furnace melt shops.

These and other objects have been achieved according to the present invention and will become apparent by reference to the disclosure and claims that follow as well as the appended drawings.

Referring to the drawing and FIGS. 1–3 therein, apparatus 10 is illustrated for removing particulate matter from a gas having a temperature of up to about 3000° F. and comprises a gas centrifuge such as the cyclone separator 12 having a tangential pipe leading into the separator, pipe 16 having opening 14 therein for receiving gases having particulate matter carried therein and which may up to about 3000° F. The separator 12 has an effluent opening 18 through which gases exit the separator, such gases containing smaller size particulate matter, an opening 20 being positioned tangentially at the end of separator 12 through which larger, heavier particles exit the separator through a tube 22 into a collecting box 24 having an opening 26 therein. A refrigerated fluid such as carbon dioxide at temperatures as low as −110° F. or nitrogen at temperatures as low as −320° F. are introduced into the separator by means of a conduit 32 and conduit 32 to a gas spray nozzle 28 positioned to discharge these refrigerated fluids at the outer wall of the separator 12 so as to force the heavier particles contained in the gas brought into the separator 12 against the walls thereof in a cyclone fashion. In addition to being suspended by means of the conduit 30, the nozzle 28 is also suspended and positioned in place in the separator 12 by means of a strut 34. In lieu of strut 34, a conduit such as conduit 30 may be employed so that the means for suspending or holding the nozzle 28 in the stream of hot gases may be cooled to prevent any structural damage thereto. In addition to reducing the temperature of gases exiting the separator 12, the spray of refrigerated fluids into the separator 12 also causes the particles to impinge in cyclone fashion against the side of the separator and also reduces the volume of the hot gases by virtue of refrigerating them which in turn also reduces the velocity at which the gases pass through the separator. Thus by employing the spray nozzle for introducing a refrigerated fluid into the separator 12, the temperatures of the gases passing through the separator 12 are reduced and thereby eliminate the need for large heat exchange devices employed in the prior art, i.e., lengths of metal pipe 8, 10 or 12 feet in diameter and the various art known equivalents therefor.

A moving filter screen may be connected to the effluent 18 of the separator 12 so that any residual finer particles that remain in the gas stream passing out of the effluent end 18 may also be removed before venting the gas stream to the atmosphere. Because the temperature of the gases may be reduced from about 3000° F. to about 250° F., a cloth screen and especially a Dacron (trademark) screen may be employed at this stage of the separation and the last of the particles may be substantially removed from the gas thus cooled. The cloth screen such as a Dacron screen 38 is arranged to present a maximum surface area, this being accomplished by using a continuous screen that is festooned over the rollers 44 in the chamber 36. A drive comprising a motor 50 and a friction drive belt 54 driven by a pulley 52 is provided, the driving action from the belt 54 in turn being transmitted to a driven roller 48 on which the continuous filter 38 passes over. The chamber 36 is divided into an upper compartment by means of a partition 56 having an opening therein which is sealed by means of seals 46 and through which the filter element 38 travels. The enclosure 36 has an influent opening 40 and an effluent opening 42 for allowing the introduction and exit of gases through the enclosure 36. A pump such as a fan 62 positioned in a housing 64 may be used to pull the gases through the enclosure 36 and vent the gases to the atmosphere through an opening 68 in the pump. The pump in turn is driven by a prime mover 66 such as an electric motor or other suitable prime movers known in the art.

In use, the exhaust gases from an arc melt furnace are led into the separator 12 by means of the conduit 16 after which carbon dioxide or nitrogen at temperatures respectively of about −110° F. or −320° F. are introduced into the separator 12 through the nozzle 28. The opening in the nozzle 28 is positioned so as to direct a stream or a plurality of streams of the refrigerated fluid against the outer walls of the separator 12, the refrigerator fluid in this respect not only forcing entrained particle matters in the gas stream against the wall 12 but also causing these particles to be lubricated in their passage over the walls. The larger particles are forced to circulate substantially around the walls of the separator 12 in helical fashion because of the centrifugal force applied thereto by virtue of the positioning of the pipe 16 and are also forced against the walls of the separator 12 by the spray of refrigerated fluid from the nozzle 28 so that a substantially large portion of the particles entrained in the fluid led into the separator 12 are circulating around the wall 12 of the separator by the time these particles reach the effluent opening 20 whereby they are led by means of conduit 22 into the collector box 24.

The enclosure 36 with the continuous belt 38 therein as previously described may be optionally employed where stringent anti-pollution controls are in effect. Otherwise, the separating apparatus 12 is sufficient in most instances to meet existing air pollution requirements.

The gas from the separator 12 exits the separator through the opening 18 and enters the enclosure 36 through the opening 40 whereupon it is filtered by means of the continuous screen 38 passing over the rollers 44. The screen 38 in turn has any particulate matter collected thereon removed by means of a vacuum cleaning device 60 positioned at the top of the enclosure 36. A partition 58 is positioned underneath the vacuum cleaning device to concentrate the vacuum cleaning effect to a specific area underneath the nozzle 60 of the vacuum cleaner. The fan 62 is employed to pump the gases through the enclosure 36 after which they are exhausted through the opening 68 in the enclosure 64 in which the fan 62 is mounted.

Although the invention has been described by reference to some embodiments, it is not intended that the novel particle removing apparatus be limited thereby, but that modifications thereof are intended to be included as falling within the broad spirit and scope of the foregoing disclosure, the following claims and the appended drawing.

I claim:

1. A method for removing particulate matter from a gas having a temperature of up to about 3000° F. comprising passing said gas through centrifugal separation means for centrifugally removing particulate matter therefrom, cooling said gas when said particulate matter is being removed therefrom to a temperature less than about 400° F. by mixing with a stream of a refrigerated fluid having a temperature from about $-50°$ F. to about $-400°$ F. and simultaneously forcing particulate matter from said gas to the inner peripheral walls of said centrifugal separation means to remove particulate matter from said gas.

2. The method of claim 1 where said centrifugal separation means comprises a cyclone separator and said particulate matter is separated from said gas by cyclone action, said refrigerated fluid being used to force particulate matter in said gas around the inner peripheral wall of said cyclone separator.

3. The method of claim 1 further comprising pumping said gas through said centrifugal separation means by means of an auxiliary pump.

4. The method of claim 1 further comprising directing the flow of gas from said gas centrifuge to a filter screen and removing particulate matter deposited from said gas on said filter screen.

5. The method of claim 4 where particulate matter is removed from said gas by directing said gas at a moving filter screen.

6. The method of claim 4 where particulate matter is removed from said filter screen by vacuuming said filter screen.

* * * * *